US009256970B2

(12) United States Patent
Hao et al.

(10) Patent No.: US 9,256,970 B2
(45) Date of Patent: Feb. 9, 2016

(54) VISUAL ANALYTICS OF MULTIVARIATE SESSION DATA USING CONCENTRIC RINGS WITH OVERLAPPING PERIODS

(71) Applicant: HEWLETT-PACKARD DEVELOPMENT COMPANY, L.P., Houston, TX (US)

(72) Inventors: Ming C. Hao, Palo Alto, CA (US); Michael Hund, Steiβlingen (DE); Umeshwar Dayal, Saratoga, CA (US); Soma Sundaram Santhiveeran, Fremont, CA (US); Halldor Janetzko, Steiβlingen (DE); Sebastian Mittelstaedt, Constance (DE); Daniel Keim, Constance (DE); Meichun Hsu, Los Altos Hills, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 232 days.

(21) Appl. No.: 13/841,514

(22) Filed: Mar. 15, 2013

(65) Prior Publication Data

US 2014/0267290 A1 Sep. 18, 2014

(51) Int. Cl.
*G06T 11/20* (2006.01)
*G06Q 30/02* (2012.01)

(52) U.S. Cl.
CPC .......... *G06T 11/206* (2013.01); *G06Q 30/0201* (2013.01)

(58) Field of Classification Search
None
See application file for complete search history.

(56) References Cited

U.S. PATENT DOCUMENTS

| 6,750,864 | B1* | 6/2004 | Anwar | 345/440 |
|---|---|---|---|---|
| 7,274,375 | B1* | 9/2007 | David | 345/619 |
| 7,590,553 | B2* | 9/2009 | Coates et al. | 705/7.26 |
| 7,664,743 | B2* | 2/2010 | Okawa | 707/769 |
| 7,932,923 | B2* | 4/2011 | Lipton et al. | 348/143 |
| 8,184,016 | B2 | 5/2012 | Gray et al. | |
| 2006/0279630 | A1* | 12/2006 | Aggarwal et al. | 348/143 |
| 2008/0275744 | A1 | 11/2008 | MacIntyre et al. | |
| 2009/0046096 | A1* | 2/2009 | Rampersad | 345/419 |
| 2011/0298804 | A1 | 12/2011 | Hao et al. | |
| 2012/0200567 | A1 | 8/2012 | Mandel et al. | |

OTHER PUBLICATIONS

Keim et al.; "CircleView—A new Approach for Visualizing Time-related Muitidimensional Data Sets;" ACM Proceedings of the working conference on Advanced visual interfaces, AVI '04, May 2004; ACM New York, NY, pp. 179-182.*

Aigner, W. et al.; "Visual Methods for Analyzing Time-oriented Data"; Jan.-Feb. 2008; pp. 47-60; vol. 14; Issue 1; http://www.informatik.uni-rostock.de/~ct/pub_fi.

* cited by examiner

*Primary Examiner* — Edward Matello
(74) *Attorney, Agent, or Firm* — Fabian VanCott (57) ABSTRACT

Visual analytics for multivariate session data using concentric rings with overlapping periods includes displaying an interactive graph in a display. The interactive graph includes at least a portion of multiple concentric rings where each one of at least some of the multiple concentric rings represents periodic time units. At least some of the multiple concentric rings are divided into cells where the cells represent smaller time periods than the time units. A color of each of the cells represents a value of a metric. Also, an overlapping period ring displayed with the multiple concentric rings where the overlapping period ring comprises segments that represent overlapping metrics from the cells of the concentric rings that correspond with the segments.

15 Claims, 4 Drawing Sheets
(1 of 4 Drawing Sheet(s) Filed in Color)

VISUAL ANALYTICS OF MULTIVARIATE SESSION DATA USING CONCENTRIC RINGS WITH OVERLAPPING PERIODS

BACKGROUND

Session data contains information about audiences that belong to a session. A session may be a time period in a particular setting, such as in a store, a movie theater, an auditorium, a concert, an online location, public place, business place, malls, airports, or other settings. The audience information may include gender, age, entrance and exit times, and dwell time in the setting. Businesses can use session data to understand their customers' behaviors and improve their business.

BRIEF DESCRIPTION OF THE DRAWINGS

The application file contains at least one drawing executed in color. Copies of this patent application publication with color drawing(s) will be provided by the Office upon request and payment of the necessary fee.

The accompanying drawings illustrate various examples of the principles described herein and are a part of the specification. The illustrated examples are merely examples and do not limit the scope of the claims.

DETAILED DESCRIPTION

Session data often includes multivariate data that can be useful for business analysis. For example, the session data may include the ages of a business's customers, the gender of its customers, the entrance time of its customers, the exit time of its customers, the dwell time (difference between entrance time and exist time) of its customers, days of the week that its customers visit the setting, other information, or combinations thereof. Displaying such multivariate data in a useful way for a user to quickly understand the details about the multivariate data can be a challenge.

The principles described herein include a method for displaying multivariate session data using concentric rings with overlapping periods to provide a user meaningful information in a visual way in a single display. Such a method includes displaying an interactive graph in a display. The interactive graph includes at least a portion of multiple concentric rings where each one of at least some of the multiple concentric rings represents periodic time units. At least some of the multiple concentric rings are divided into cells where the cells represent smaller time periods than the time units. A color of each of the cells represents a value of a metric. Also, an overlapping period ring is displayed with the multiple concentric rings where the overlapping period ring comprises segments that represent overlapping metrics from the cells of the concentric rings that correspond with the segments.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
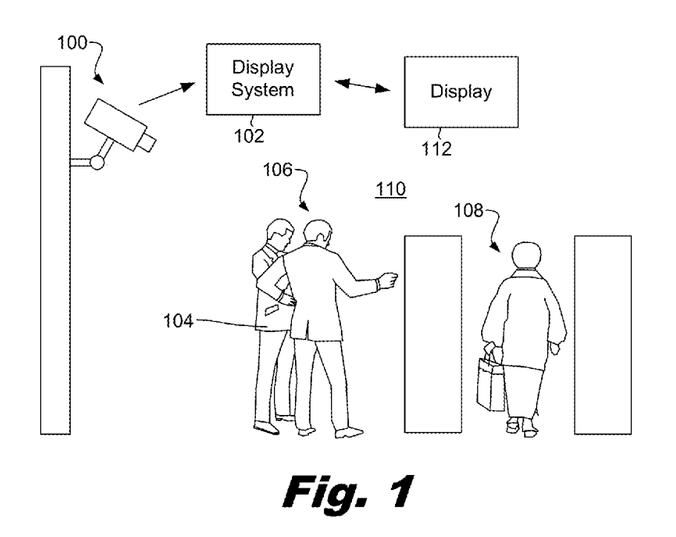
FIG. 1 is a diagram of an example of a camera in communication with a display system according to the principles described herein.

FIG. 1 is a diagram of an example of a camera (100) in communication with a display system (102) according to the principles described herein. In this example, the camera (100) is positioned to record the presence of individuals (104, 106, 108) in a store setting (110). The camera is also in communications with a display system (102) that is in communication with a display (112).

A store owner may be interested to understand the demographics of the store's patrons. For example, the store owner may desire to understand session data, which can include the ages of the store's patrons, gender of the store's patrons, when the patrons come to the store, how long the patrons stay, other information, or combinations thereof. Such information can assist the store owner when making staffing decisions, opening decisions, closing decisions, and purchasing decisions.

The store may have a camera (100) positioned to view the store's setting (110). The camera (100) can record when individuals (104, 106, 108) enter the store and exit the store. The entrance and exit times can be recorded with timestamps so the user can determine the time of day that a patron entered the store, exited the store, and as a result, the amount of time that the patrons were in the store.

The camera (100) may be any appropriate type of camera that allows at least some of the session data to be recorded. For example, a camera that can determine the presence of individuals through analysis of visual color spectrum may be used. In other examples, an infrared camera, a depth camera, a time of flight camera, another type of camera, another type of sensor, or combinations thereof may be used in accordance with the principles described herein.

The input from the camera (100) is sent to the display system (102) where session data is extracted. For example, the display system (102) may extract the times that patrons entered the setting (110), exited the setting (110), dwelt in the setting (110), other information, or combinations thereof. The display system (102) may actively request the information from the camera (100), or the display system (102) may passively receive the data from the camera (100). The display system (102) may analyze the data to determine the session data. In other examples, the display system (102) obtains the post-analyzed data from the camera (100) or an intermediary between the camera (100) and the display system (102). In some examples, the display system (102) obtains the data in real time. In other examples, the display system (102) receives the data at periodic or on demand intervals.

The display system (102) determines how to represent the times that the session data was recorded. Further, the display system (102) determines the colors, which represent metrics, to appear in cells that corresponded to the determined times. Such information is caused to be displayed in the display (112) by the display system (102) to allow an individual to visually analyze the session data. The display (112) may include concentric rings that represent time units, such as days, that the camera is recording. The most aged day may be represented by the inner most concentric ring. Similarly, the second most aged concentric ring may represent the second most inner ring. The concentric rings represent more recent time periods proportional to how far away the concentric rings are spaced from the inner most concentric ring.

Each of the concentric rings may be divided into cells that represent smaller time periods than the time units of the concentric rings. For example, the time unit represented with the concentric rings may be a full day, while the cells may represent an hour, a minute, another time period less than a day, or combinations thereof.

At least one metric is represented by a color of the cells of the concentric rings. For example, a color may present an average dwell time that patrons are in the store. As the average dwell time changes, the color may also change. If the metric has a value of zero during a particular time, the corresponding cell may be black.

The colors of the cell may be any appropriate color in accordance with the principles described herein. For example, the cell's color may be selected from a continuum of colors that change from one color to another to represent a low dwell time to a high dwell time. In other examples, the brightness of the cell's color changes to represent different values of dwell times. In yet other examples, the color continuum includes more than two different colors.

Further, the display also includes an overlapping period session that has segments that correspond to time periods represented by the cells of the concentric rings. One segment of the overlapping period ring may correspond to a consistent time period across each of the time units. For example, a segment of the overlapping period ring may represent each of the cells that represent 3:01 pm. The segment may display a value of a metric that summarizes the metrics at 3:01 pm over multiple days, such as the average number of people in the store at 3:01 pm.

While this example has been described with reference to specific metrics and time periods presented by the concentric rings' cells, any appropriate metrics and/or time periods may be used in accordance with the principles described herein. Further, while this example has been described with reference to specific time units represented by the concentric rings, any appropriate time units may be used in accordance with the principles described herein.

Figure 2:
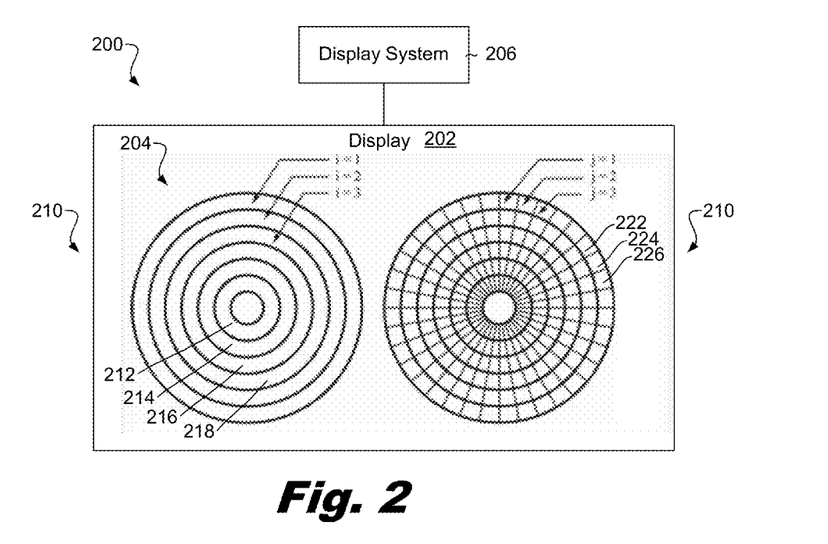
FIG. 2 is a diagram of an example of a template of a display of concentric rings according to the principles described herein.

FIG. 2 is a diagram of an example of a template (200) of a display (202) of concentric rings (204) according to the principles described herein. In this example, the display (202) is in communication with the display system (206) where the number of concentric rings is determined, the number of cells per concentric ring is determined, the colors represented by the color cells is determined, and other information is determined. The display system (206) causes the concentric rings (204), the rings' cells, and the cells' colors to be displayed in the display (202).

A first side (210) of the template (200) depicts the concentric rings (204). An inner most ring (212) represents a most oldest time unit and the concentric rings represent progressively more recent time periods as the concentric rings get farther from the inner most ring (212). In some examples, the time unit is a day. The concentric rings spaced outwardly from the inner most ring (212) represent the same time unit, but represent later periods in time. For example, if the inner most ring (212) represents a single hour, then rings (214, 216, 218) also represents a single hour. Thus, the length of the concentric rings does not affect the time unit. However, the inner most ring (212) is more aged than concentric ring (214). Likewise, concentric ring (214) is more aged than concentric ring (216) and so forth.

On the second side (220) of the template (200), the concentric rings (212, 214, 216, 218) are divided into cells (222, 224, 226). Each cell (222, 224, 226) represents a consistent time period regardless of the cell's size. As an example, the cells can represent equal time periods that evenly divide the unit time represented by the concentric ring. The cells in concentric ring (218) have a larger size than the cells in concentric ring (214). However, the cells in these concentric rings (214, 218) represent the same time period amount.

The spatial location of each cell indicates the cell's relationship to its adjacent cells. The cells may be referred to in a coordinate system of (i,j) where i represents the concentric ring and j represents the cell. For example, a cell with a coordinate of (1,1) represents a time period that immediately precedes a cell with a coordinate of (1, 2). Further, a cell with a coordinate of (1,1) represents the same time period of the day as cells with coordinates (2,1), (3,1), (4,1), and so forth.

Figure 3:
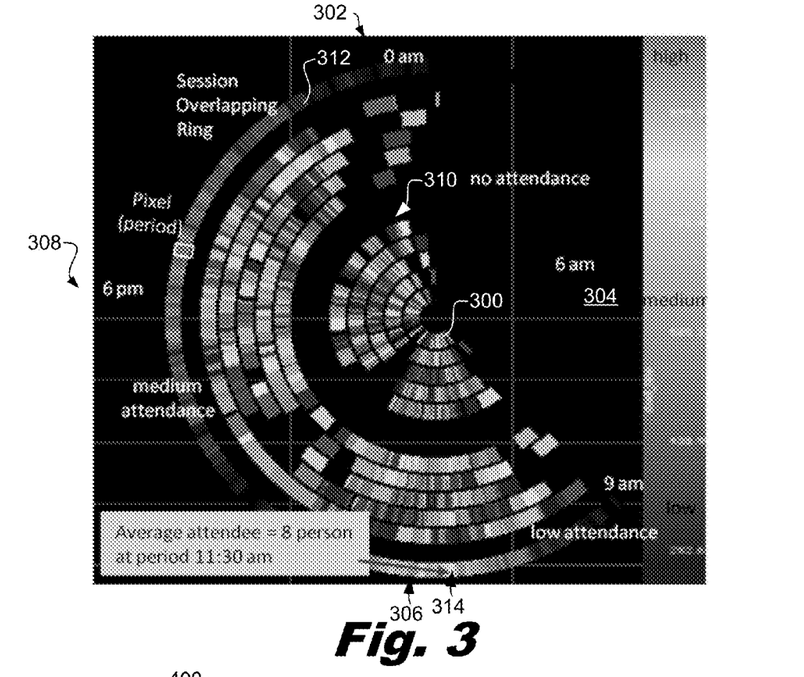
FIG. 3 is a diagram of an example of displaying multivariate session data according to the principles described herein.

FIG. 3 is a diagram of an example of displaying multivariate session data according to the principles described herein. In this example, the multivariate data is displayed in concentric rings and cells of those concentric rings. The color of the cells represents the average dwell time that individuals are in a particular setting, such as a store. A camera may record the entrance and exit times that individuals enter and leave the store to determine the dwell times. The color represents the average dwell time, if one individual is in a store for a long period of time, the color will depict a longer dwell time than if two individuals were in the store for a shorter amount of time.

The inner most concentric ring (300) represents the time unit of one day, a full 24 hours. Each of the inner most concentric ring's cells represent a time period of one minute each. The interactive graph is labeled to indicate that at the middle top (302) represents a time period at 0 a.m. The time periods successively wrap around in the concentric rings in a clockwise manner. Thus, 6 a.m. is represented by cells at the middle right (304) of the interactive graph, noon is represented by cells at the middle bottom (306) of the interactive graph, and 6 p.m. is represented by cells at the middle left (308) of the interactive graph.

When the camera or other sensor records no individual's presence within the store, the average dwell time in the store has a value of zero and is represented with a background color in the cells. Low dwell times are represented with a blue color while the high dwell times are represented with red. The blue and red colors are joined in a continuum that progresses from blue to green to yellow to red.

The early morning hours are represented in the interactive graph from around the 0 a.m. cells to around 9 a.m. These cells are black because no one is present in the store during these hours. Likewise, the concentric rings (310) that represent the weekend are also black because the store is closed on those days.

An overlapping period ring (312) that is positioned around the concentric rings is divided into segments. Each segment has pixel values that range from black to white and represent a summary of the metrics represented by the corresponding time periods at the same time. For example, segment (314) represents a summary of the time periods on the same azimuth as segment (314). The azimuth of segment (314) and the corresponding cells represent 11:30 a.m. for each day that is represented by the concentric rings. In this example, segment (314) represents the average number of individuals that were in the store at 11:30 a.m. across the days of the week. Here, the average number of individuals in the store at 11:30 a.m. is eight.

Also, the entrance and exit times of when customers are entering and leaving the store can be determined by virtue of when the cell have color values. For example, customers do not generally enter the store until after 9 a.m. Likewise, the customers generally leave the store around midnight.

In this example, the overlapping period ring (312) uses the brightness of the segment's pixel values to represent the summary metrics, such as the average number of individuals in the store. However, the overlapping period ring's segments may use any appropriate pixel value to represent the summary metrics, such as a color, a color continuum with a single color, a color continuum with multiple colors, other visual mechanisms, or combinations thereof.

The interactive graph may be displayed in an interactive monitor that allows a user to select cells of the concentric rings or segments of the overlapping period ring (312) to drill down into the information corresponding to their representative times. For example, a user may select a cell by hovering over the cell with a cursor. In response to being selected, a pop-up window is generated that gives additional information about that time period such as the number of people in the store at that time period and the cell's exact dwell time are presented in the window. Also, the user may select a segment in the overlapping period ring (312). In such an example, a pop-up window may represent summary details about the corresponding time periods.

While this example has been described with reference to specific mechanisms for selecting a cell or segment, any appropriate mechanisms for selecting cells or segments may be used in accordance with the principles described herein. For example, the cells and/or segments may be selected by clicking on the cells or segments, a keyboard input, a touch screen input, a motion detected gesture input, a voice input, another input, or combinations thereof. Also, while the examples above have been described with reference to a specific mechanism for displaying additional information about the cells and/or segments, any appropriate mechanism may be used in accordance with the principles described herein. For example, the additional information may be displayed in a pop-up window, a box adjacent to the interactive graph, an audible message, an email, another mechanism, or combinations thereof.

Figure 4:
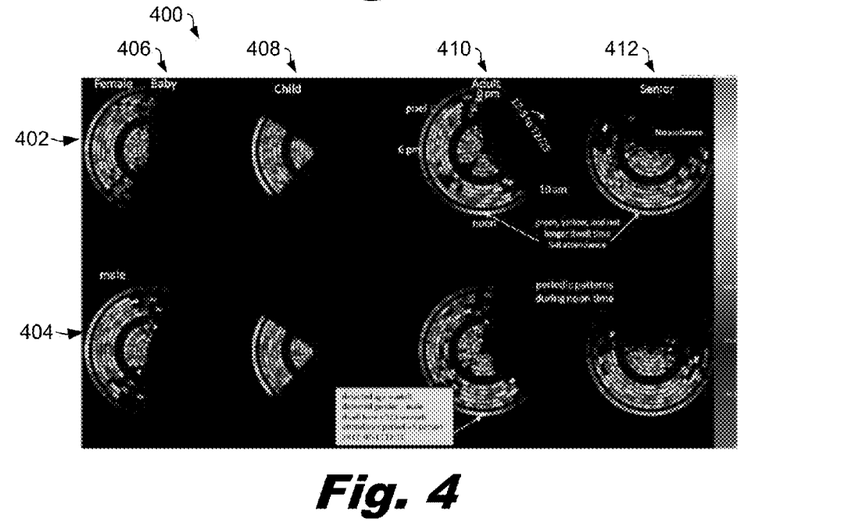
FIG. 4 is a diagram of an example of displaying session multivariate data according to the principles described herein.

FIG. 4 is a diagram of an example of displaying multivariate session data according to the principles described herein. In this example, multiple interactive graphs are displayed in a single display (400). Each of the interactive graphs represents different demographics. For example, the top row (402) of interactive graphs represents females that patronize the store, and the bottom row (404) represents male patrons. The interactive graphs are also organized in columns (406, 408, 410, 412). Column (406) represents baby patrons. Column (408) represents child patrons. Column (410) represents adult patrons, and column (412) represents senior patrons. Thus, the entrance times, exit times, dwell times, average attendance, and so forth are available to the user for each of these demographics.

For example, the user may determine that children enter the store in the early afternoon when school finishes for the day. Further, the children leave around nine p.m. As a result, the user may arrange his business practices to account for school children being in the store around those times. Further, the user may determine that seniors patronize the store at an earlier time on average than younger adults and stop patronizing the store at an earlier hour than younger adults. As a result, the business owner may decide to give employees that provide better customer service to seniors an earlier shift to be around when the seniors are in the store.

While the examples herein have been described with reference to specific types of information that the user may determine based on the interactive graphs in FIG. 4, any appropriate type of determinations may be made. Further, while the interactive graphs in FIG. 4 have been described with reference to specific demographics, the interactive graphs may be made to display any appropriate type of demographic.

Figure 5:
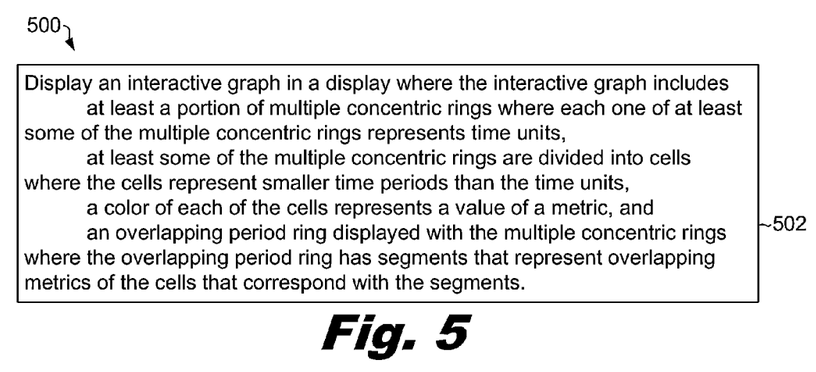
FIG. 5 is a diagram of an example of a method for displaying session multivariate data with concentric rings according to the principles described herein.

FIG. 5 is a diagram of an example of a method (500) for displaying multivariate session data with concentric rings according to the principles described herein. In this example, the method (500) includes displaying (502) an interactive graph in a display. The interactive graph includes at least a portion of the multiple concentric rings where each one of at least some of the multiple concentric rings represents time units. At least some of the multiple concentric rings are divided into cells where the cells represent smaller time periods than the time units. A color of each of the cells represents a value of a metric. Also, an overlapping period ring is displayed with the multiple concentric rings where the overlapping period ring has segments that represent overlapping metrics of the cells that correspond with the segments.

The metric may be any appropriate metric. For example, the metric may be an average dwell time that individuals are observed in a setting, such as a store or other location. In some examples, the metrics represent a dwell time of online visitors to a website. The metric may also represent the number of online visitors or patrons to a bricks and mortar store. In other examples, the metrics include earnings, sales, physical measurements, temperature, weather forecasts, database metrics, other metrics, or combinations thereof.

The values of the metrics can be represented with a pixel color values. For example, different colors may represent different metric values. Further, different color brightnesses may represent different metric values.

The overlapping period ring is divided into segments that correspond with the segments of the concentric rings. For example, a segment of the overlapping ring may correspond to all of the cells of the concentric rings that represent a specific time period. The segment can display overlapping metrics that summarize metrics about the correspond time periods. In one instances, the overlapping metric is the average number of individuals across the period times represented with the corresponding cells while the cells represent the average dwell time. If the average number of individuals represented by the segment is high, the segment is caused to display a bright color. In general, the greater the value of the overlapping metric, the brighter the segment will be. On the other hand, if the overlapping metric is low, the segment is caused to display a darker color. For example, in the event that the overlapping metric has a value of zero, the segment displays a background color, such as black or another color.

Segments of the overlapping period rings may represent the overlapping metrics with any appropriate spectrum of colors in accordance with the principles described herein. In some examples, the spectrum of colors used by the segments includes a black white colormap where black represents no overlapping data and white represents high overlapping data.

The overlapping metrics may include other metrics that also summarize metrics of the cells. Further, the overlapping period ring may be displayed in any appropriate location. For example, the overlapping period ring may be displayed outside of the concentric rings. In other examples, the overlapping period ring may be displayed within the inner most concentric rings, between selected concentric rings, other locations, or combinations thereof.

The segments of the overlapping period ring and the cells of the concentric rings may be associated with other metrics. Such other metrics may be displayed in response to user input. The user input may indicate that the user is selecting the cell or segment to drill down to more information. For example, the user input may include a cursor input, a keyboard input, a voice input, a touch screen input, another type of input, or combinations thereof.

The display may include multiple interactive graphs where each of the interactive graphs has multiple concentric rings with cells representing time periods. Each of the interactive graphs may represent different demographics, such as age, gender, height, size, individuals who actually purchase something from the store, other demographics, or combinations thereof.

The data that is displayed by the concentric rings and cells may be gathered by a sensor. The sensor may be a camera that operates in the visual light spectrum, the infrared light spectrum, other light spectrums, or combinations thereof. In some examples, the sensor is a sensor that measures the visits to a website.

Figure 6:
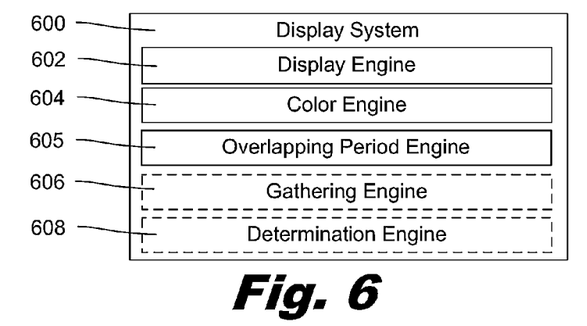
FIG. 6 is a diagram of an example of a display system according to the principles described herein.

FIG. 6 is a diagram of an example of a display system (600) according to the principles described herein. The display system (600) includes a display engine (602), a color engine (604), and an overlapping period engine (605). In this example, the display system (600) also includes a gathering engine (606) and a determination engine (608). The engines (602, 604, 605, 606, 608) refer to a combination of hardware and program instructions to perform a designated function. Each of the engines (602, 604, 605, 606, 608) may include a processor and memory. The program instructions are stored in the memory and cause the processor to execute the designated function of the engine.

The gathering engine (606) gathers the data and provides the data to the determination engine (608). The determination engine (608) determines the metric values that are to be displayed in each of the cells. The display engine (602) displays the concentric rings and their associated cells. The color engine (604) selects the color to be displayed in each of the cells. The overlapping period engine (605) displays the overlapping period ring that has segments that represent overlapping metrics of the corresponding cells of the concentric rings.

Figure 7:
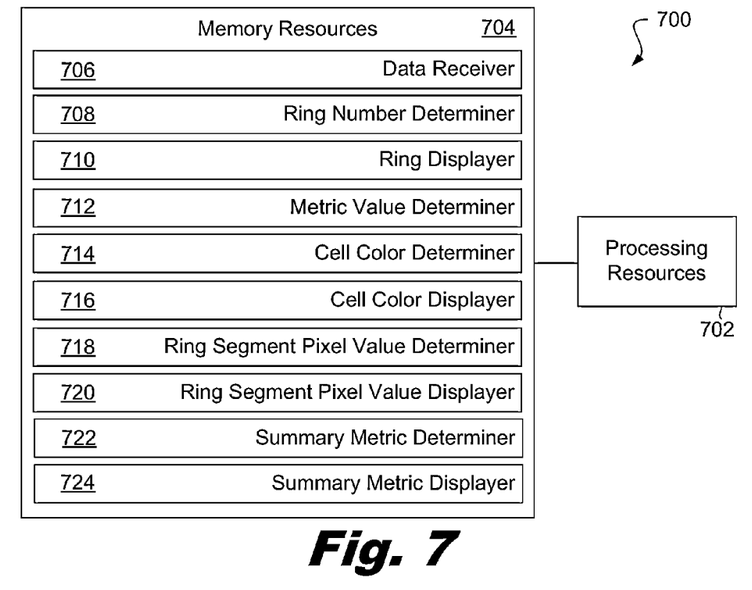
FIG. 7 is a diagram of an example of a display system according to the principles described herein.

FIG. 7 is a diagram of an example of a display system (700) according to the principles described herein. In this example, the display system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the display system (700). The programmed instructions shown stored in the memory resources (704) include a data receiver (706), a ring number determiner (708), a ring displayer (710), a metric value determiner (712), a cell color determiner (714), a color cell displayer (716), a ring segment pixel value determiner (718), a ring segment pixel value displayer (720), a summary metric determiner (722), and a summary metric displayer (724).

The memory resources (704) include a computer readable storage medium that contains computer readable program code to cause tasks to be executed by the processing resources (702). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, read only memory, flash memory, electrically erasable program read only memory, magnetic storage media, or types of memory, or combinations thereof.

The data receiver (706) represents programmed instructions that, when executed, cause the processing resources (702) to recognize when an issue exists in the network. The ring number determiner (708) represents programmed instructions that, when executed, cause the processing resources (702) to determine the number of rings that are displayed in the interactive graph. The ring display (710) represents programmed instructions that, when executed, cause the processing resources (702) to display the determined number of rings.

The metric value determiner (712) represents programmed instructions that, when executed, cause the processing resources (702) to determine the value of the metric to be displayed in the interactive graphs. The cell color determiner (714) represents programmed instructions that, when executed, cause the processing resources (702) to determine the cell colors based on the determined values. The color cell displayer (716) represents programmed instructions that, when executed, cause the processing resources (702) to display the determined colors.

The ring segment pixel value determiner (718) represents programmed instructions that, when executed, cause the processing resources (702) to determine the value of the segment pixel. The ring segment pixel value display (720) represents programmed instructions that, when executed, cause the processing resources (702) to display the determined pixel values in the segments. The summary metric determiner (722) represents programmed instructions that, when executed, cause the processing resources (702) to determine the summary metrics that are to be displayed to the user in response to user input. The summary metric displayer (724) represents programmed instructions that, when executed, cause the processing resources (702) to display the determined summary metrics in response to user input.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries and may be accessed from a remote location over a network connection while the programmed instructions are located locally. Thus, the display system (700) may be implemented on a user device, on a server, on a collection of servers, or combinations thereof.

The display system (700) of FIG. 7 may be part of a general purpose computer. However, in alternative examples, the display system (700) is part of an application specific integrated circuit.

Figure 8:
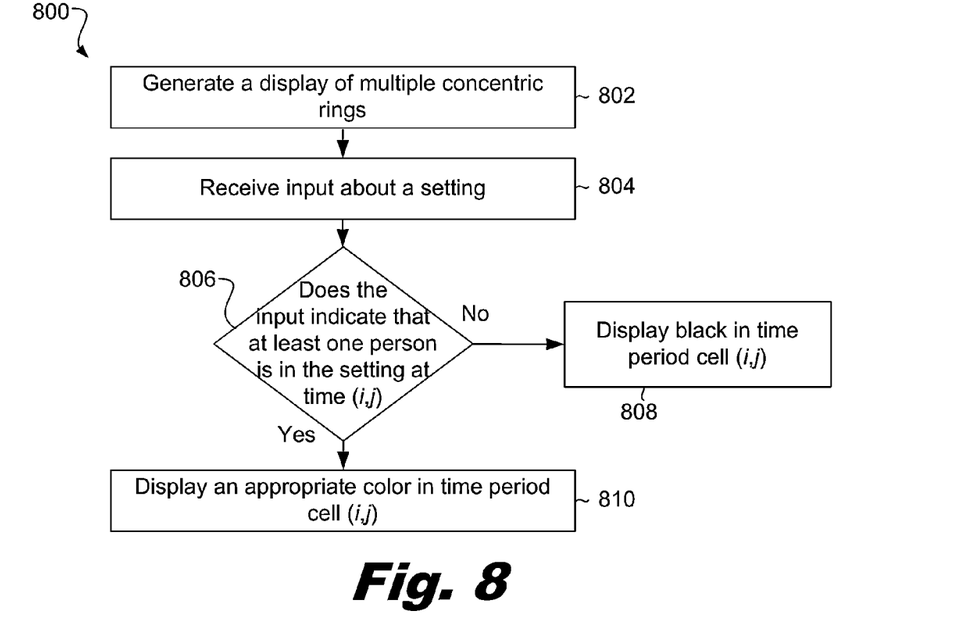
FIG. 8 is a diagram of an example of a flowchart of a process for displaying session multivariate data with concentric rings according to the principles described herein.

FIG. 8 is a diagram of an example of a flowchart (800) of a process for displaying multivariate session data with concentric rings according to the principles described herein. In this example, the process includes generating (802) a display of multiple concentric rings and receiving (804) input about a setting. The setting may be a store setting, an audience setting, a physical location setting, a website setting, another setting, or combinations thereof.

The process also includes determining (806) whether the input indicates that at least one person is in the setting at a time (i,j) wherein i represents the time unit of the concentric rings and j represents the cell. If the input does not indicate that the at least one person is in the setting, the process includes displaying (808) black in the time period cell (i,j). On the other hand, if the input does indicate that at least one person is in the setting at time period cell (i,j), the process includes displaying (810), the appropriate color in time period cell (i,j).

Figure 9:
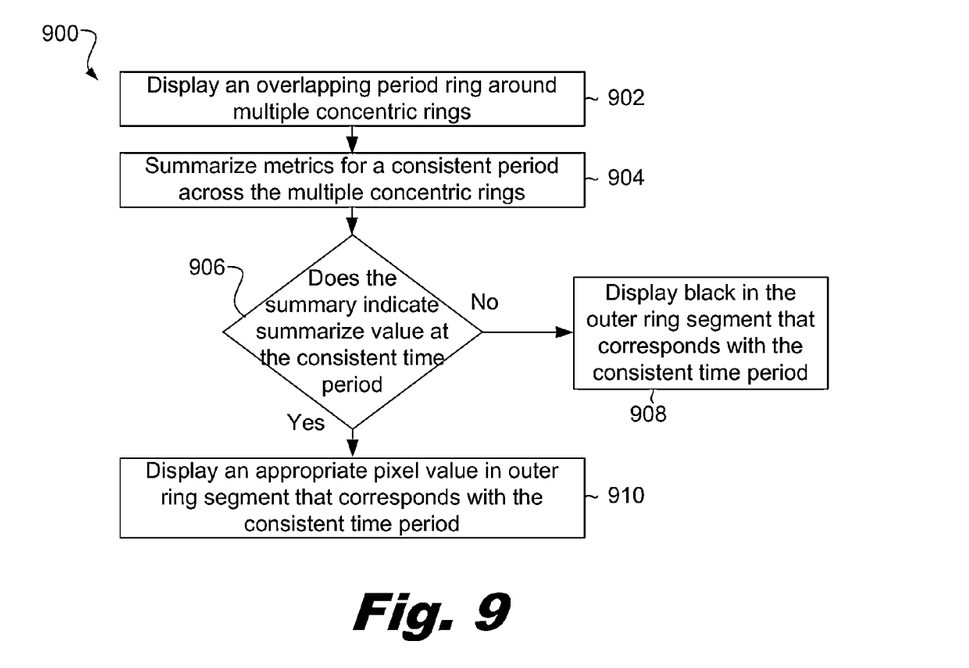
FIG. 9 is a diagram of an example of a flowchart of a process for displaying session multivariate data with concentric rings according to the principles described herein.

FIG. 9 is a diagram of an example of a flowchart (900) of a process for displaying multivariate session data with concentric rings according to the principles described herein. In this example, the process includes displaying (902) an overlapping period ring around the multiple concentric rings and summarizing (904) metrics for a consistent time period across the multiple concentric rings.

The process also includes determining (906) whether the summary indicates a summarized value at the consistent time period. If the summary does not indicate a value greater than zero, the process includes displaying (908) black in the outer ring segment that corresponds with the consistent time periods. On the other hand, if the summary indicates a value greater than zero, the process includes displaying (910) an appropriate pixel value in the outer ring segment that corresponds with the consistent time period.

While the examples above have been described with reference to specific colors and metrics in the cells and segments, any appropriate colors and/or metrics may be used in accordance with the principles described herein. Further, while the examples above have been described with reference to specific settings, any appropriate setting may be used in accordance with the principles described herein. For example, the principles described herein may be applied to produce real time scheduling, web click streams, internet user sessions, other applications, or combinations thereof. While the time units and time periods have been described above with reference to specific durations of time, any appropriate duration of time may be used for the time units and time periods in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of visual analytics for multivariate session data using concentric rings with overlapping periods, comprising:
    displaying an interactive graph in a display, the interactive graph comprising:
        at least a portion of multiple concentric rings where each one of at least some of the multiple concentric rings represents periodic time units;
        the at least some of the multiple concentric rings are divided into cells where the cells represent smaller time periods than the time units;
        a color of each of the cells representing a value of a metric, wherein the metric defines information regarding an observed audience; and
        an overlapping period ring displayed with the multiple concentric rings where the overlapping period ring comprises segments that represent overlapping metrics from the cells of the concentric rings that correspond with the segments,
    wherein displaying the interactive graph in the display comprises presenting the interactive graph with multiple interactive graphs, wherein the multiple interactive graphs display metrics associated with different demographics of individuals, and
    wherein each of the multiple concentric rings represents a unit of time, wherein recency of the units of time represented by the concentric rings is proportional to how far away the concentric rings are spaced from an inner-most concentric ring.

2. The method of claim 1, wherein a second metric in the segments of the overlapping period ring is represented with a brightness of the segments.

3. The method of claim 1, wherein the metric is an average dwell time that individuals are observed in a setting.

4. The method of claim 1, wherein the overlapping metric comprises an average number of individuals observed in a setting.

5. The method of claim 1, further comprising displaying additional metrics associated with one of the cells in response to user input.

6. The method of claim 1, further comprising gathering data about the metric from a sensor.

7. The method of claim 1, further said color of said cells is a background color when said value of said metric is zero.

8. The method of claim 1, further comprising displaying a window in response to detection of a user's selection of one of the cells, the window comprising the additional metrics defining information about audiences that belong to a session defined by the time period of that cell.

9. A system of visual analytics for displaying multivariate session data using concentric rings with overlapping periods, comprising:
    program instructions stored in memory that cause a processor to operate multiple engines;
    a displaying engine to display an interactive graph in a display where the interactive graph comprises at least a portion of multiple concentric rings in a display where each one of at least some of the multiple concentric rings represent periodic time units and at least some multiple concentric rings are divided into cells where the cells represent smaller time periods than the time units;
    a color engine to display a color in each of the cells to represent a value of a metric, wherein the metric defines information regarding an observed audience; and
    an overlapping period engine to display at least some of an overlapping period ring with said multiple concentric rings where the overlapping period ring is divided in segments that represent overlapping metrics of the cells of the concentric rings that correspond with the segments,
    wherein each of the multiple concentric rings represents a unit of time, wherein recency of the units of time represented by the concentric rings is proportional to how far away the concentric rings are spaced from an inner-most concentric ring.

10. The system of claim 9, further comprising a gathering engine to gather data about the metric from a sensor.

11. The system of claim 10, further comprising a determination engine to determine the metric based on the gathered data.

12. The method of claim 9, wherein the overlapping period engine to further display a brightness to represent the overlapping metrics.

13. The system of claim 12, wherein the overlapping period engine to further display overlapping metrics associated with the cells of the concentric rings in response to user interaction with the overlapping period ring.

14. A computer program product of visual analytics for displaying multivariate session data using concentric rings with overlapping periods, comprising:
a non-transitory computer readable storage medium, the non-transitory computer readable storage medium comprising computer readable program code embodied therewith, the computer readable program code comprising program instructions that, when executed, causes a processor to:
display an interactive graph in a display where the interactive graph comprises at least a portion of multiple concentric rings where each one of at least some of the multiple concentric rings represents periodic time units and at least some multiple concentric rings are divided into cells where the cells represent smaller time periods than the time units;
display a color in each cell to represent a value of a metric;
display at least some of an overlapping period ring with said multiple concentric rings where the overlapping period ring is divided in segments that represent overlapping metrics of the cells of the concentric rings that correspond with the segments; and
display additional summary metrics associated with the smaller time periods in response to user interaction with the overlapping period ring,
wherein displaying the interactive graph in the display comprises presenting the interactive graph with multiple interactive graphs, wherein the multiple interactive graphs display metrics associated with different demographics of individuals.

15. The computer program product of claim 14, wherein the value of the metric represents an average dwell time that individuals are observed in a setting and the overlapping metrics comprise an average number of individuals observed in the setting during a consistent time period across multiple time units.

* * * * *

UNITED STATES PATENT AND TRADEMARK OFFICE
CERTIFICATE OF CORRECTION

PATENT NO.       : 9,256,970 B2                                      Page 1 of 1
APPLICATION NO.  : 13/841514
DATED            : February 9, 2016
INVENTOR(S)      : Ming C. Hao et al.

It is certified that error appears in the above-identified patent and that said Letters Patent is hereby corrected as shown below:

On the title page, Primary Examiner, in column 2, line 1, delete "Edward Matello" and insert -- Edward Martello --, therefor.

Claims

In column 11, line 9, in Claim 12, delete "method" and insert -- system --, therefor.

Signed and Sealed this
Twelfth Day of July, 2016

Michelle K. Lee
*Director of the United States Patent and Trademark Office*